(No Model.)
S. F. DUNCAN.
STAY PIECE OR GUARD FOR WIRE FENCES.
No. 374,461. Patented Dec. 6, 1887.
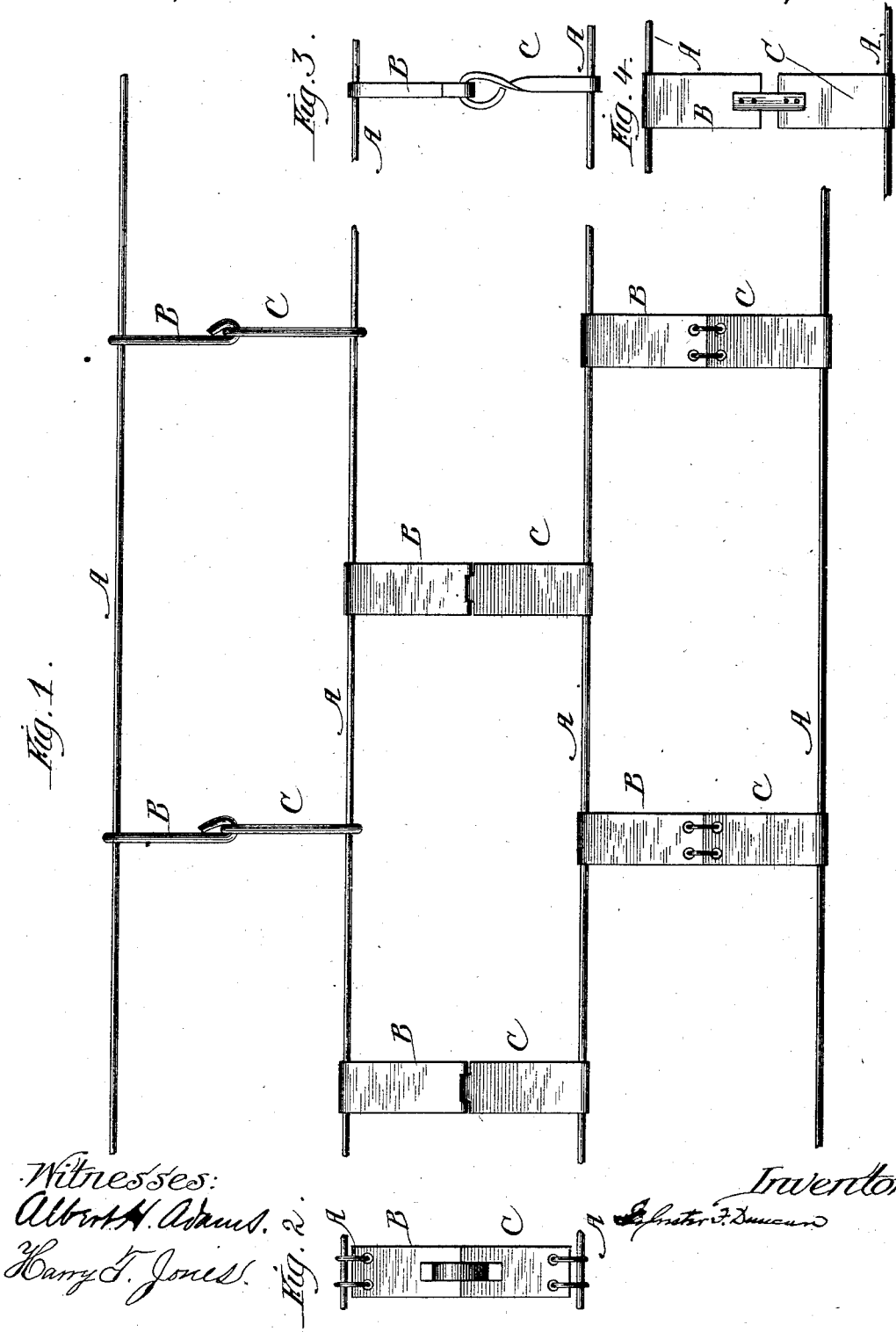

UNITED STATES PATENT OFFICE.

SYLVESTER F. DUNCAN, OF CHICAGO, ILLINOIS, ASSIGNOR TO THE WIRE FENCE IMPROVEMENT COMPANY, OF SAME PLACE.

STAY PIECE OR GUARD FOR WIRE FENCES.

SPECIFICATION forming part of Letters Patent No. 374,461, dated December 6, 1887.

Application filed March 14, 1887. Serial No. 230,876. (No model.)

*To all whom it may concern:*

Be it known that I, SYLVESTER F. DUNCAN, residing at Chicago, in the county of Cook and State of Illinois, and a citizen of the United States, have invented a new and useful Improvement in Stay Pieces or Guards for Wire Fences, of which the following is a specification, reference being had to the accompanying drawings, in which—

Figure 1 is a section of wire fence with several guards in position; Figs. 2 and 3, sections of wires with single guards or stays applied; Fig. 4, a face view of a modification, showing the use of a flat spring-hinge.

The object of this invention is to form flexible stay-guards for wire fences of rigid material, made yielding by being made in sections hinged or flexibly connected together; and its nature consists in the improvement hereinafter described and claimed as new.

In the drawings, A indicates fence-wires in position, which may be made of single round wires, as shown, flat wire or strips, or twisted wires, which may be provided with barbs or be left plain, as may be desired.

B C indicate the upper and lower sections of the guard or stay pieces, which may be hinged together by hinges having pintles, or with ring or loop connections, as shown in Figs. 1 and 3, or by a spring-hinge, as shown in Fig. 2.

The leaves or sections B C of the guards may be made of sheet metal or other suitable material of sufficient thickness to make them rigid, and if made of lighter material they may be corrugated lengthwise to give them the necessary rigidity. They may also be made of strong round wire, as shown in the upper part of Fig. 1, or a flat wire, as shown in Fig. 3, as I do not limit myself to any special kind or form of material; but I prefer flat strips, as they render the fence more visible to domestic animals. The strips may be attached at their ends to the fence-wires by simply folding them around, as shown in Figs. 1 and 3, or by attaching wires, as shown in Fig. 2, and they may also be attached in any other suitable or well-known manner.

By making the stay-pieces of comparatively rigid material and joining them at or near the middle I provide stay-guards which will be rigid while they are in vertical line, but which may yield or give way under any strain or pressure which may be brought to bear against them, and which, when in vertical line and properly attached to the fence-wires, will give the wires a support and prevent their separation or spreading, and which, owing to the amount of material of which they are composed, will be durable, as it will require very considerable rusting or oxidation to injure or destroy them.

When a flat spring-hinge is used, as shown in Fig. 4, the spring will be less liable to break by separating the sections, as shown.

What I claim as new, and desire to secure by Letters Patent, is—

1. A stay piece or guard for fences, consisting of the sections B C, hinged together at their adjoining ends and adapted to connect with horizontal fence wires or rails at their opposite ends, substantially as described.

2. The stay pieces or guards composed of sections B C, hinged together at their adjoining ends, in combination with the main fence wires or rails A, substantially as described.

SYLVESTER F. DUNCAN.

Witnesses:
ALBERT H. ADAMS,
O. W. BOND.